United States Patent
Shalev et al.

(10) Patent No.: US 10,984,193 B1
(45) Date of Patent: Apr. 20, 2021

(54) UNSUPERVISED TEXT SEGMENTATION BY TOPIC

(71) Applicant: Intuit Inc., Mountain View, CA (US)

(72) Inventors: Adi Shalev, Tel Aviv (IL); Yair Horesh, Tel Aviv (IL); Yehezkel Shraga Resheff, Tel Aviv (IL); Oren Sar Shalom, Tel Aviv (IL); Alexander Zhicharevich, Tel Aviv (IL)

(73) Assignee: Intuit Inc., Mountain View, CA (US)

(*) Notice: Subject to any disclaimer, the term of this patent is extended or adjusted under 35 U.S.C. 154(b) by 0 days.

(21) Appl. No.: 16/736,874

(22) Filed: Jan. 8, 2020

(51) Int. Cl.
    *G06F 40/279* (2020.01)
    *G06F 17/18* (2006.01)
    *G06N 20/10* (2019.01)

(52) U.S. Cl.
    CPC ............ *G06F 40/279* (2020.01); *G06F 17/18* (2013.01); *G06N 20/10* (2019.01)

(58) Field of Classification Search
    CPC .............................. G06F 40/279; G06N 20/10
    See application file for complete search history.

(56) References Cited

U.S. PATENT DOCUMENTS

| | | | |
|---|---|---|---|
| 10,599,774 B1* | 3/2020 | Luo | G06F 40/30 |
| 10,637,826 B1* | 4/2020 | Luo | G06K 9/6215 |
| 2005/0143971 A1* | 6/2005 | Burstein | G06F 40/253 |
| | | | 704/4 |
| 2011/0258188 A1* | 10/2011 | AbdAlmageed | G06F 16/7844 |
| | | | 707/736 |
| 2012/0079372 A1* | 3/2012 | Kandekar | G06F 3/0482 |
| | | | 715/256 |
| 2019/0066663 A1* | 2/2019 | Kotri | G06N 3/08 |
| 2019/0370336 A1* | 12/2019 | Prakash | G06N 3/084 |
| 2020/0110882 A1* | 4/2020 | Ripolles Mateu | G06F 16/3347 |
| 2020/0184016 A1* | 6/2020 | Roller | G06N 20/10 |
| 2020/0250274 A1* | 8/2020 | Tan | G06N 20/00 |

* cited by examiner

*Primary Examiner* — Asher D Kells
(74) *Attorney, Agent, or Firm* — DLA Piper LLP (US)

(57) ABSTRACT

A processor may generate a plurality of vectors from an original text by processing the original text with at least one unsupervised learning algorithm. Each of the plurality of vectors may correspond to a separate portion of a plurality of portions of the original text. The processor may determine respective segments to which respective vectors belong. The processor may minimize a distance between at least one vector belonging to the segment and a known vector from among one or more known vectors and applying a label of the known vector to the segment.

20 Claims, 6 Drawing Sheets

UNSUPERVISED TEXT SEGMENTATION BY TOPIC

BACKGROUND OF THE DISCLOSURE

Text segmentation is the process of dividing written text into meaningful units, such as words, sentences, or topics. This is a fundamental task in natural language processing (NLP) that can improve text understanding, summarization, retrieval, and more. Text segmentation often relies on supervised processing methods where a very large corpus of text is manually analyzed and labeled by human readers and then used to train a machine learning (ML) NLP system. The training can be costly and error prone, and it can be difficult to obtain a large enough corpus to train a useful model.

DETAILED DESCRIPTION OF SEVERAL EMBODIMENTS

Embodiments described herein may use an unsupervised ML approach to identify topics within text and/or to segment portions of text into constituent topic subsets. Embodiments may perform such processing based on the intuition that, with high probability, it may be expected that sequential sentences or other portions of a text should "agree" with one another and may therefore belong to the same segment. Given two distributions, the probability that consecutive portions may be assigned to the same segment is given by their inner product (which is the probability that they are both assigned to the first segment added to the probability they are both assigned to the second segment, and so on). For example, consider a transcript of a call made to a call center (e.g., a help hotline for a software product). The transcript may include a record of a conversation between two parties, a caller and a call center employee. The conversation may include several segments, such as an introduction, a caller authentication, a problem description, a problem understanding, a solution, a resolution, an ending, other segments, and/or a subset of these segments. In the call center example, segmentation of the transcript may allow the segments of the transcript to be analyzed separately, for example to assess employee performance and/or to assess customer satisfaction. Because the disclosed embodiments use unsupervised ML, the segmentation and subsequent analysis may be performed without a large body of past conversations that have been segmented (e.g., by an expert human reader).

Figure 1:
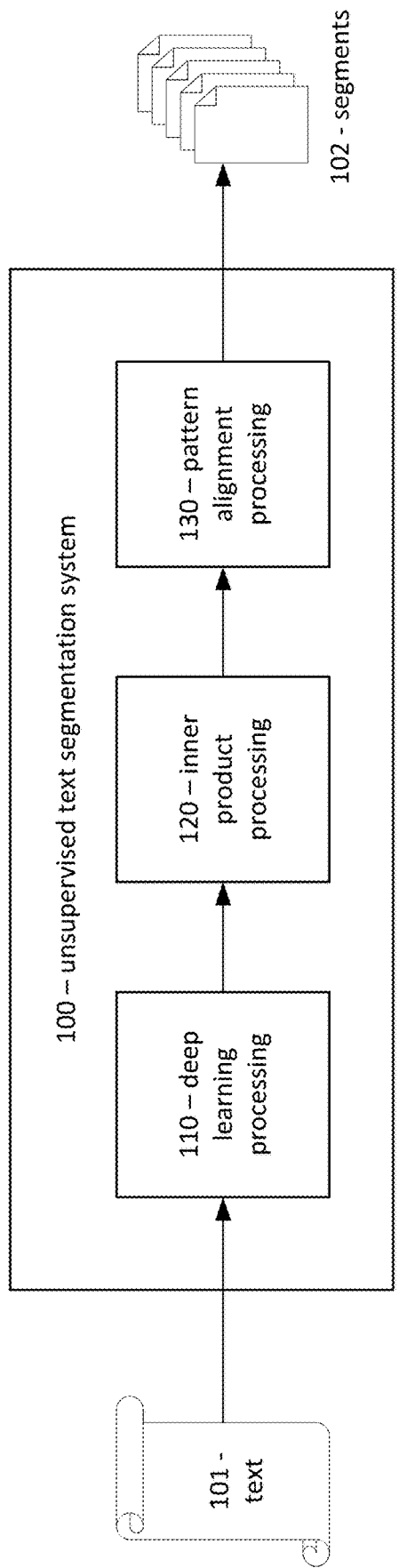
FIG. 1 shows an unsupervised text segmentation system according to an embodiment of the present disclosure.

FIG. 1 shows an unsupervised text segmentation system 100 according to an embodiment of the present disclosure. System 100 may receive text 101 and identify one or more segments 102 of the received text 101 using an unsupervised ML approach. Some embodiments of system 100 may function as follows.

System 100 may generate a plurality of vectors by processing original text with at least one unsupervised learning algorithm, where each of the plurality of vectors corresponds to a separate portion of the original text. As noted above, a conversation spans several segments (e.g., introduction, authentication, problem description, problem understanding, solution, resolution, ending). Because there is no training data corpus used with unsupervised analysis, a label that assigns the correct segment to any two consecutive utterances may not exist. However, if on average a segment changes every X utterances (for instance, after 10 utterances), then with high probability (e.g., 1−1/X, which is much higher than 50%) two consecutive utterances belong to the same segment. Therefore, system 100 may feed the utterances one by one to deep learning processing 110 (which may operate one or more unsupervised deep learning models) and receive a distribution of the topics (e.g., the utterance "Thank you for calling Intuit, how may I help you?" may receive a score of 95% likely to belong to the introduction segment, and 5% to belong to the solution segment). In the absence of label data, it may not be immediately certain whether this distribution is correct. However, with high probability, it may be expected that the next utterance should "agree" with this distribution and to belong to the same segment. Given two distributions, the probability that they assign both utterances to the same segment is given by their inner product, which may yield the chances these two predictions agree with each other. Given a conversation with N utterances, the algorithm may produce N distributions.

System 100 may perform inner product processing 120 on the output of deep learning processing 110. In so doing, for each of the plurality of vectors, system 100 may determine a segment to which the vector belongs by performing inner product processing on the vector and at least one additional vector of the plurality of vectors. For example, some embodiments may maximize the inner product between the N−1 consecutive utterances. This objective alone will converge to a naive solution where all utterances belong to the same segment (which will maximize the inner product). Therefore, system 100 may also apply negative sampling. For each utterance, system 100 may sample random utterances (that have to be distant enough from the base utterance). The probability of having an utterance and a random one in the same segment may be low. Therefore, the negative sampling may minimize the sum of the inner products between the base utterance and each of the random ones. Computing the log of the inner products (rather than just the inner products) may further improve results.

The previously-described processing may divide the conversation into meaningful segments, but not necessarily to interpretable ones. That is, elements contained in a given segment may be highly related to one another, but it may not be readily apparent how each segment should be labeled, or what the "label" of the segment should be. As a result, the generated segment list may not align with a desired segment list (e.g., introduction, authentication, etc.). Therefore, system 100 may perform pattern alignment processing 130 to find one or more patterns per each desired segment (e.g., the string "how can I help you" may be deterministically assigned to the introduction segment). This may produce the alignment between the generated segments and the desired ones. For example, system 100 may label each of the plurality of segments by minimizing a distance between at least one vector belonging to the segment and a known vector having a label. Then, system 100 may apply the label of the minimum-distance known vector to the segment.

Once segments are identified and labeled, the output may be labeled segments 102 of the original text 101. This may include new data created automatically by system 100 as a result of the processing described above. This new data may be stored in memory, displayed to a user, and/or fed to additional automated processes and/or systems. For example, system 100 may generate a new text comprising at least one of the portions of the original text, the at least one of the portions of the original text being included in the new text on the basis of the label of the segment to which the at least one vector, corresponding to the at least one of the portions of the original text, belongs.

Figure 2:
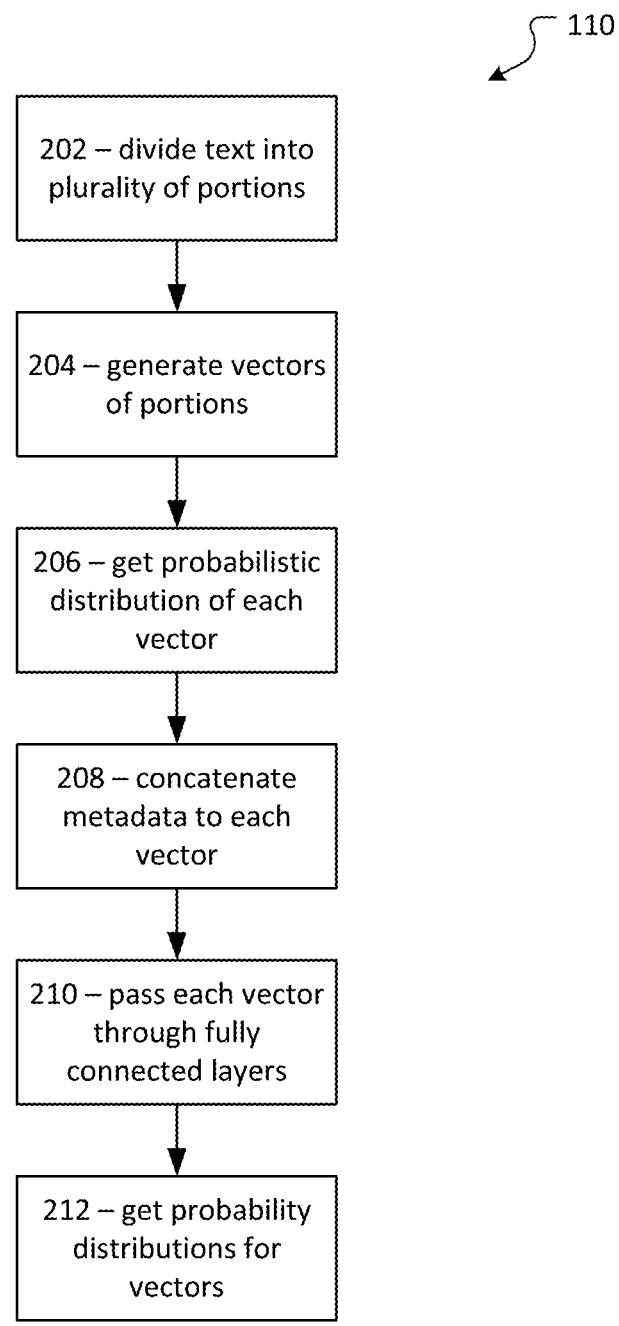
FIG. 2 shows deep learning processing according to an embodiment of the present disclosure.

FIG. 2 shows deep learning processing 110 in greater detail according to an embodiment of the present disclosure. As described above, system 100 may perform deep learning processing 110 to generate a distribution of topics in the text. In some embodiments, deep learning processing 110 may include some or all of the processing shown in FIG. 2. Deep learning processing 110 is described herein as being applied to a plurality of portions, and in various embodiments system 100 may perform deep learning processing 110 sequentially or in parallel on each of the plurality of portions.

At 202, system 100 may divide the text into a plurality of portions. For example, in a text that contains multiple sentences, each sentence may be a separate portion which system 100 may identify based on punctuation. In a text that contains a transcript of a conversation, each utterance by a party to the conversation may be a separate portion which system 100 may identify based on speaker identification, punctuation, and/or document formatting. In a text that contains a list, each list item may be a separate portion which system 100 may identify based on bullet points, numbers, lines, etc.

At 204, system 100 may generate vectors for each of the plurality of portions. For example, unsupervised learning processing applied to each of the plurality of portions may include applying word embedding (e.g., Word2Vec or similar algorithm(s))) to obtain a separate respective vector for each portion. In some embodiments this may include, for example, processing each word using the word embedding algorithm and forming a vector from the combination of vectors of each individual word in a given sentence (i.e., portion). In other embodiments, sentences (or other portions) of the text may be processed by the word embedding algorithm to obtain total vectors for the sentences directly.

At 206, system 100 may find a probabilistic distribution for each of the plurality of vectors. For example, system 100 may process each vector separately with at least one unsupervised learning algorithm to determine a probabilistic distribution of the vector relative to a plurality of vectors. Each vector may be passed to deep learning processing, for example by encoding the output of the word embedding using convolutional neural networks (CNN), recurrent neural networks (RNN), long short term memory (LSTM), or other unsupervised algorithm(s), thereby obtaining a respective probabilistic distribution for each vector. The probabilistic distribution may give a probability that a portion represented by the vector corresponds to a given segment. For example, a first sentence may belong to a first segment with 80% probability, to a second segment with 20% probability, to a third segment with 0% probability, and to a fourth segment with 0% probability. A second sentence may belong to the first segment with 70% probability, to the second segment with 10% probability, to the third segment with 20% probability, and to the fourth segment with 0% probability. In various embodiments, any number of portions may be analyzed against any number of possible segments, and may have any distribution of probabilities as long as the probabilities for a given portion add up to 100% (or 1).

At 208, system 100 may concatenate metadata to each vector. The metadata may describe the portion of the text that corresponds to the vector (e.g., for a given vector, the portion of the text that was input into Word2Vec to generate that vector). For example, in the case of a conversation transcript, the metadata may include speaker ID (e.g., caller or call recipient), sentence ID (e.g., first sentence in conversation, second sentence in conversation, etc.), and/or other metadata. At this point, system 100 may have a plurality of enriched vectors that have been processed by deep learning (giving probability distributions) and metadata (giving vector descriptive information).

At 210, system 100 may pass each vector through one or more fully connected layers (e.g., of a CNN). There may be the same number of layers (K) as number of vectors in the entire corpus of vectors produced by processing at 204, for example. After passing through the fully connected layers, each resulting vector may be a vector of size K. Accordingly, processing at 210 may normalize the vectors such that each vector may be normalized to have a same length as all other vectors (e.g., length K).

At 212, system 100 may get probability distributions for the normalized vectors. For example, system 100 may pass vectors of size K through the softmax function to produce K probabilities in a probability distribution. Each of the K values may get a nonnegative probability, and the probabilities all may sum up to 1. So, for example, if there are 100 sentences, there are 100 probability distributions.

At this stage, system 100 may have generated probability distributions relating the vectors (and, therefore, the original portions) to one another, but further processing such as that described below with respect to FIG. 3 may improve the accuracy of the probabilities.

Figure 3:
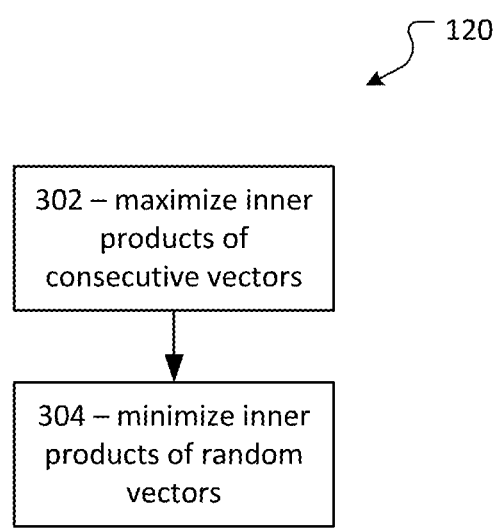
FIG. 3 shows inner product processing according to an embodiment of the present disclosure.

FIG. 3 shows inner product processing 120 according to an embodiment of the present disclosure. Inner product processing 120 may be performed to improve the accuracy of the probability distributions generated by deep learning processing 110. Inner product processing 120 is described herein as being applied to a plurality of vectors, and in various embodiments system 100 may perform inner product processing 120 sequentially or in parallel on each of the plurality of vectors.

At 302, system 100 may maximize the inner product between the K−1 consecutive vector pairs. For each pair of vectors, system 100 may maximize an inner product between them. However, as noted above, maximization alone may converge to a naive solution where all consecutive vectors belong to the same segment (which will maximize the inner product).

At 304, to address the problem of convergence, system 100 may minimize inner products of random pairs of vectors. For each vector, system 100 may sample random vectors (that may be selected to be more distant from some threshold distance away from the base vector). The probability of having randomly selected pairs of vectors in the same segment may be low. Therefore, the negative sampling may minimize the sum of the inner products between the base vector and the random vector for each base vector. Computing the log of the inner products (rather than just the inner products) may further increase accuracy in some embodiments.

At this stage, system 100 may have generated accurate probability distributions relating the vectors (and, therefore, the original portions) to one another, but there may be no information explaining what the distributions mean. For example, it may be possible to state that a first sentence has a 90% chance of belonging to segment 1 and a 10% chance of belonging to segment 2, but there may be no information about which portions of the text segments 1 and 2 are (e.g., it may be unclear whether a given segment is the intro, problem statement, problem solution, etc.). Accordingly, system 100 may perform further processing, such as that described below with respect to FIG. 4.

Figure 4:
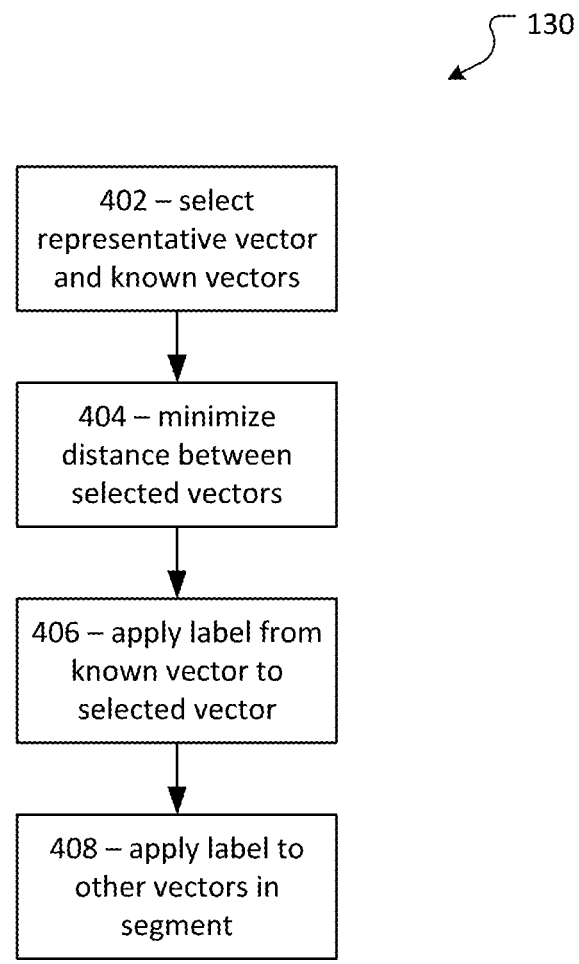
FIG. 4 shows pattern alignment processing according to an embodiment of the present disclosure.

FIG. 4 shows pattern alignment processing 130 according to an embodiment of the present disclosure. By performing pattern alignment processing 130, system 100 may find one or more patterns per each desired segment (e.g., vectors may be deterministically assigned to labeled segments). Pattern alignment processing 130 is described herein as being applied to a plurality of vectors, and in various embodiments system 100 may perform pattern alignment processing 130 sequentially or in parallel on each of the plurality of vectors.

At 402, system 100 may select representative vectors from each segment. For example, if there are X segments within the probability distributions generated as described above, a representative vector may be selected from each of the X segments. System 100 may also obtain example known vectors. For example, a model text may be divided into a plurality of known segments (e.g., X known segments). In a specific example, the model text may be a conversation divided into segments such as an introduction, a caller authentication, a problem description, a problem understanding, a solution, a resolution, an ending, other segments, and/or a subset of these segments. A sentence or portion of each such segment may be vectorized similarly to the processing described above (e.g., according to the processing of FIG. 2) or by some other process, but the resulting vector may be definitively associated with a segment from the model text (e.g., introduction). In some embodiments, processing at 402 may including selecting an appropriate model text based on a type of text being processed (e.g., selecting a set of known conversation vectors for a conversation under analysis, a set of known contract vectors for a contract under analysis, etc.).

At 404, system 100 may minimize distances between representative vectors and known vectors. For example, system 100 may apply a distance minimization algorithm to a representative vector and each known vector to find which of the known vectors has a shortest distance to the representative vector. Minimization algorithms may include Kullback-Leibler divergence (KL divergence), Jensen-Shannon divergence, Wasserstein distance, etc.

At 406, system 100 may label representative vectors according to the closest known vectors. For example, a first representative vector (from a first segment) may be matched with a particular known segment (e.g., problem description) by the processing of 404. Accordingly, system 100 may label the first representative vector as belonging to the particular known segment (e.g., the first representative vector from the conversation transcript text under analysis represents an utterance that was part of a problem description portion of a conversation).

At 408, based on the labeling of 406, system 100 may label all other vectors in respective same segments of labeled representative vectors. For example, each vector in a first segment may receive the label for the representative vector from the first segment, each vector in a second segment may receive the label for the representative vector from the second segment, and so on. Continuing the example of 406, each vector in the first segment of the conversation transcript text under analysis may be labeled as representing an utterance that was part of the problem description portion of the conversation. The labeled vectors may be used to label the segments which they represent. Accordingly, after performing pattern alignment processing 130 of all representative vectors, system 100 may output labeled segments 102, where each segment of an input text 101 is labeled with the label of the portion to which it belongs.

Figure 5:
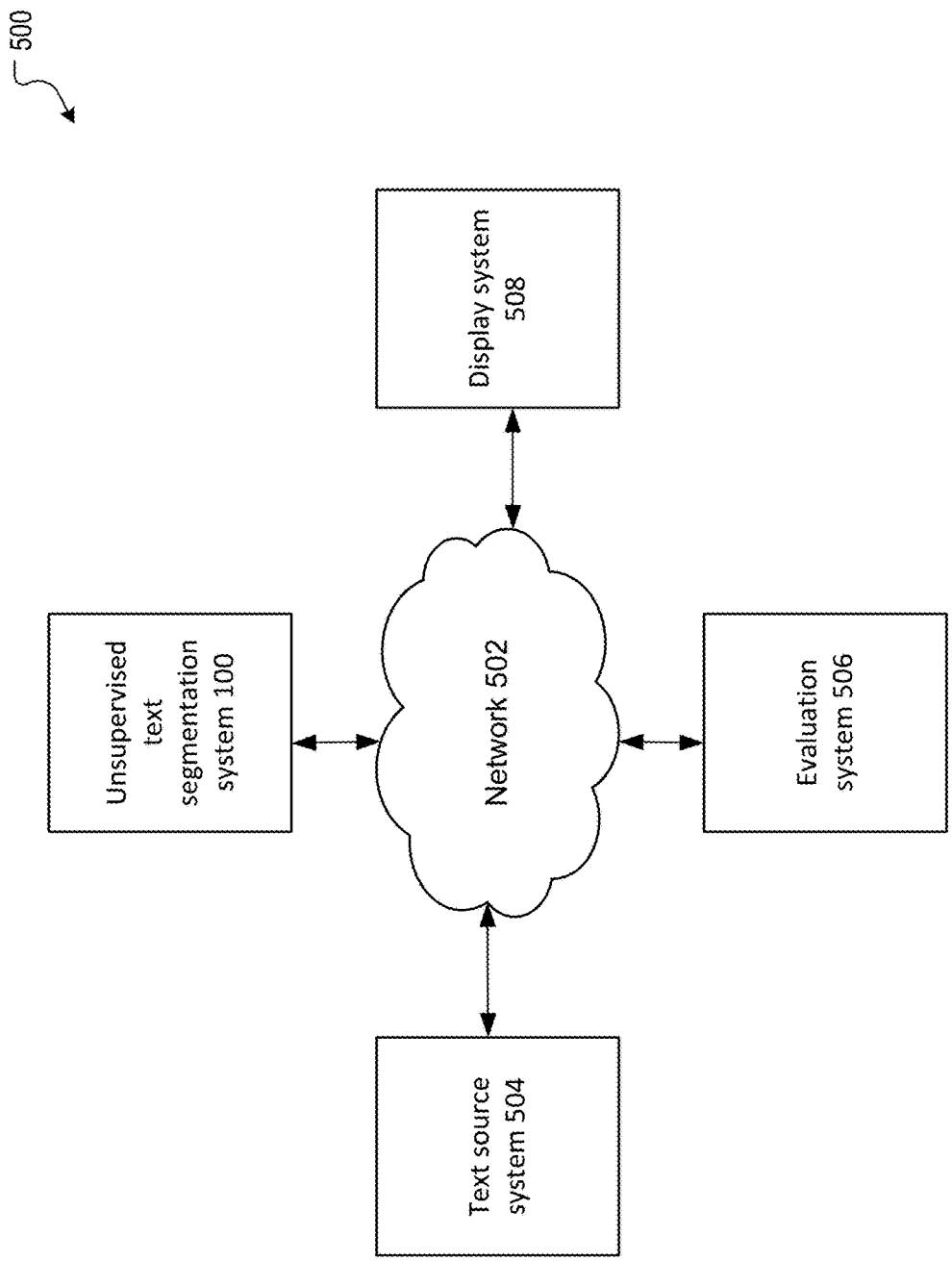
FIG. 5 shows a text analysis computing environment according to an embodiment of the present disclosure.

The aforementioned system 100 and the processing it performs may be applied to any type of text. For example, texts may be analyzed and/or displayed in an enhanced fashion after being processed by system 100. FIG. 5 shows a text analysis computing environment 500 that may leverage system 100 according to an embodiment of the present disclosure. The computing environment may include one or more devices in communication with one another through a network 502. Network 502 may include any public and/or private network, such as the Internet. The devices may include unsupervised text segmentation system 100, a text source system 504, an evaluation system 506, and/or a display system 508. These systems are illustrated as separate components connected by network 502 in the example of FIG. 5, but in some embodiments, each system (or some of the systems) may collectively be elements of a single device and/or may be coupled to one another by direct connections rather than by network 502. Likewise, in some embodiments, each system (or some of the systems) may be distributed among multiple devices. An example computing device that may provide some or all elements of FIG. 5 is described below with respect to FIG. 6.

In the example of FIG. 5, text that is analyzed by unsupervised text segmentation system 100 may be supplied by text source system 504. For example, text source system 504 may be an aggregator of articles, or a medical database, or an individual user's computer (e.g., with which the user writes emails or word processor documents or the like), or any other device that generates and/or stores text. In a specific example for ease of explanation, text source system 504 may be a device that records and/or collects transcripts of phone conversations between callers and call center employees.

Text source system 504 may provide text (e.g., transcripts) 101 to unsupervised text segmentation system 100 (e.g., through network 502). Unsupervised text segmentation system 100 may process the text as described above (e.g., with respect to FIGS. 2-4). The output of such processing may include a plurality of labeled segments 102 of the input text 101.

Labeled segments 102 may be used for any purpose. The environment 500 of FIG. 5 provides two example systems which may use the labeled segments. For example, evaluation system 506 may take the labeled segments 102 (in some cases, in addition to the input text 101) as input and perform further processing that benefits from the labeling. For example, when the text is a transcript of a conversation between a caller and an employee, evaluation system 506 may be used to perform quality control on the call center experience. The labels may allow the evaluation system 506 to analyze portions of the conversation independently using different metrics (e.g., friendliness may be important for an introduction, while effectiveness may be important for a problem solution) and/or to characterize the conversation (e.g., break down amounts of time spent in each portion of the conversation, generate a summary of the discussion, etc.). Such evaluation may be an automatic process in some examples.

In another example, display system 508 may take the labeled segments 102 (in some cases, in addition to the input text 101) as input and perform further processing that benefits from the labeling. For example, display system 508, evaluation system 506, and/or text source system 504 may be elements of a same computing device (and/or may be used by a same user), and may allow the user to evaluate her own writing. The user may be able to input a text sample and receive a breakdown of how it is constructed relative to one of a variety of templates (e.g., where the templates are sources of known vectors as described above) through a user interface presented by display system 508.

Figure 6:
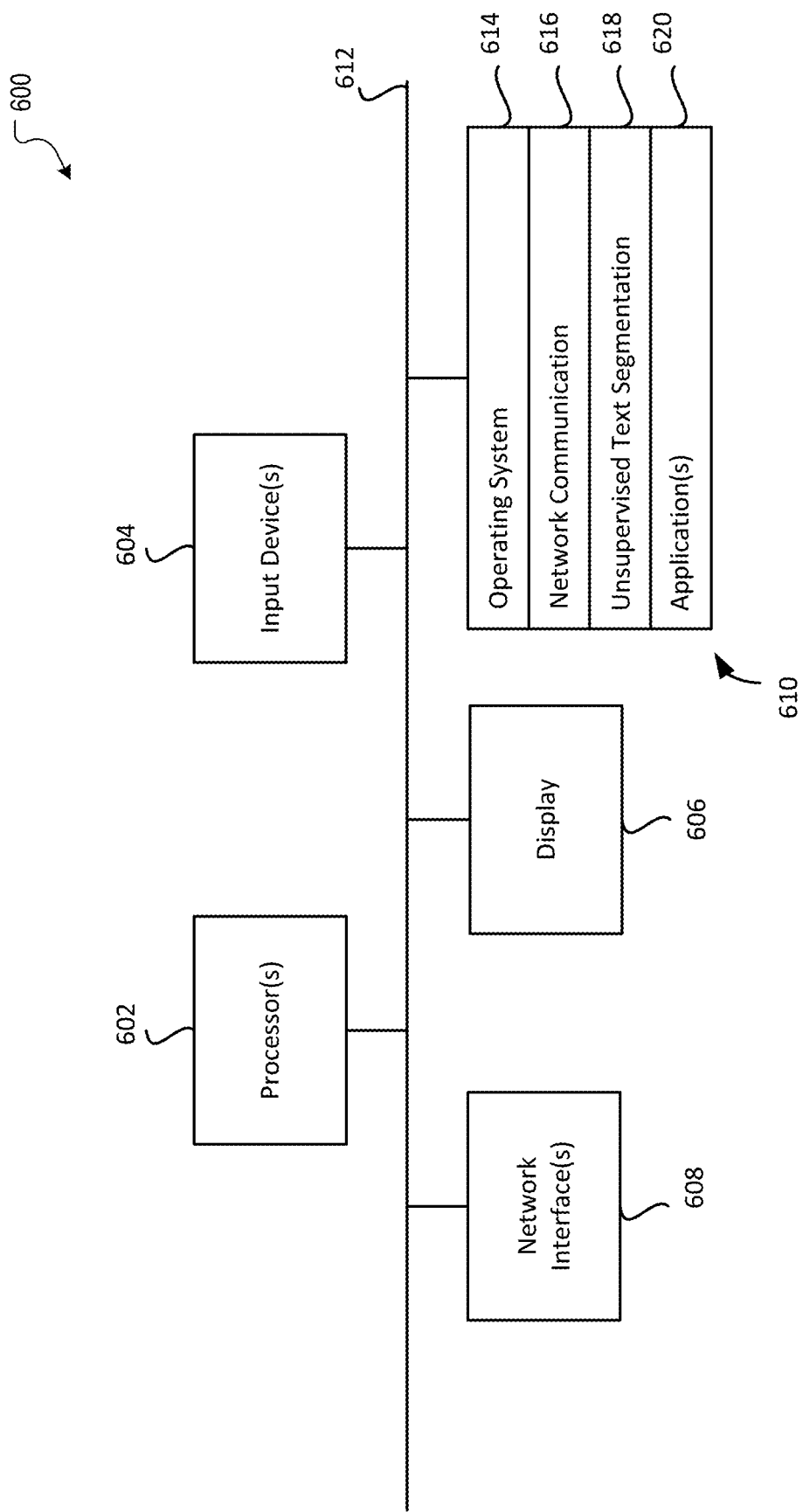
FIG. 6 shows a computing device according to an embodiment of the present disclosure.

FIG. 6 shows a computing device 600 according to an embodiment of the present disclosure. For example, computing device 600 may function as unsupervised text segmentation system 100 and/or as text source system 504, evaluation system 506, display system 508, any combinations thereof, or any portions thereof. Computing device 600 may be implemented on any electronic device that runs software applications derived from compiled instructions, including without limitation personal computers, servers, smart phones, media players, electronic tablets, game consoles, email devices, etc. In some implementations, computing device 600 may include one or more processors 602, one or more input devices 604, one or more display devices 606, one or more network interfaces 608, and one or more computer-readable mediums 610. Each of these components may be coupled by bus 612, and in some embodiments, these components may be distributed among multiple physical locations and coupled by a network.

Display device 606 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 604 may be any known input device technology, including but not limited to a keyboard (including a virtual keyboard), mouse, track ball, and touch-sensitive pad or display. Bus 612 may be any known internal or external bus technology, including but not limited to ISA, EISA, PCI, PCI Express, NuBus, USB, Serial ATA or FireWire. In some embodiments, some or all devices shown as coupled by bus 612 may not be coupled to one another by a physical bus, but by a network connection, for example. Computer-readable medium 610 may be any medium that participates in providing instructions to processor(s) 602 for execution, including without limitation, non-volatile storage media (e.g., optical disks, magnetic disks, flash drives, etc.), or volatile media (e.g., SDRAM, ROM, etc.).

Computer-readable medium 610 may include various instructions 614 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 may establish and maintain network connections (e.g., software for implementing communication protocols, such as TCP/IP, HTTP, Ethernet, telephony, etc.).

Unsupervised text segmentation instructions 618 may include instructions that enable computing device 600 to perform unsupervised text segmentation system 100 functionality as described herein. Application(s) 620 may be an application that uses or implements the processes described herein and/or other processes, for example applications used to provide the functionality of text source system 504, evaluation system 506, and/or display system 508. The processes may also be implemented in operating system 614.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method of unsupervised text segmentation by topic comprising:
   generating, by a processor, a plurality of vectors from an original text, the generating comprising processing the original text with at least one unsupervised learning algorithm, each of the plurality of vectors corresponding to a separate portion of a plurality of portions of the original text;
   for each of the plurality of vectors, determining, by the processor, a segment to which the vector belongs of a plurality of segments;
   for each of the plurality of segments:
      minimizing, by the processor, a distance between at least one vector belonging to the segment and a known vector from among one or more known vectors that correspond to one or more of the portions of the original text, the known vector having a label; and
      applying the label to the segment; and
   generating, by the processor, a new text comprising the one or more of the portions of the original text, the one or more of the portions of the original text being included in the new text based on the label.

2. The method of claim 1, wherein the generating comprises dividing the original text into the plurality of portions.

3. The method of claim 2, wherein the generating comprises, for each of the plurality of portions, processing the portion with the at least one unsupervised learning algorithm to determine a probabilistic distribution of the portion relative to the plurality of segments.

4. The method of claim 1, wherein the generating comprises applying a Word2Vec algorithm to the original text to generate the plurality of vectors.

5. The method of claim 1, wherein the generating comprises, for each of the plurality of vectors, concatenating metadata to the vector, the metadata describing the portion corresponding to the vector.

6. The method of claim 1, wherein the generating comprises, for each of the plurality of vectors:
   passing the vector through at least one fully connected layer to obtain a vector of size K, where K is a total number of the plurality of vectors; and
   applying a softmax function to the vector of size K to obtain a probability distribution for the vector.

7. The method of claim 1, wherein the determining comprises performing inner product processing including:
   for each pair of consecutive vectors of the plurality of vectors, maximizing an inner product of the pair of consecutive vectors;
   for each of the plurality of vectors, minimizing an inner product of the vector and a randomly selected second vector of the plurality of vectors.

8. The method of claim 1, wherein the labeling comprises:
   determining a content type for the original text; and
   selecting the known vector corresponding to the content type.

9. The method of claim 8, wherein the content type is a transcript of a conversation, and each of the plurality of portions comprises a separate utterance within the transcript.

10. A system configured to perform unsupervised text segmentation by topic comprising:
    a processor; and
    a non-transitory computer readable memory storing instructions that, when executed by the processor, cause the processor to perform processing comprising:
       generating a plurality of vectors from an original text, the generating comprising processing the original text with at least one unsupervised learning algorithm, each of the plurality of vectors corresponding to a separate portion of a plurality of portions of the original text;
       for each of the plurality of vectors, determining a segment to which the vector belongs of a plurality of segments;
       for each of the plurality of segments, minimizing a distance between at least one vector belonging to the segment and a known vector from among one or more known vectors that correspond to one or more of the portions of the original text, the known vector having a label;

generating a new text comprising the one or more of the portions of the original text, the one or more of the portions of the original text being included in the new text based on the label; and storing the new text in the memory.

11. The system of claim 10, wherein the generating comprises dividing the original text into the plurality of portions.

12. The system of claim 11, wherein the generating comprises, for each of the plurality of portions, processing the portion with the at least one unsupervised learning algorithm to determine a probabilistic distribution of the portion relative to the plurality of segments.

13. The system of claim 10, wherein the generating comprises applying a Word2Vec algorithm to the original text to generate the plurality of vectors.

14. The system of claim 10, wherein the generating comprises, for each of the plurality of vectors, concatenating metadata to the vector, the metadata describing the portion corresponding to the vector.

15. The system of claim 10, wherein the generating comprises, for each of the plurality of vectors:

passing the vector through at least one fully connected layer to obtain a vector of size K, where K is a total number of the plurality of vectors; and applying a softmax function to the vector of size K to obtain a probability distribution for the vector.

16. The system of claim 10, wherein the determining comprises performing inner product processing including:

for each pair of consecutive vectors of the plurality of vectors, maximizing an inner product of the pair of consecutive vectors;

for each of the plurality of vectors, minimizing an inner product of the vector and a randomly selected second vector of the plurality of vectors.

17. The system of claim 10, wherein the labeling comprises:

determining a content type for the original text; and selecting the known vector corresponding to the content type.

18. The system of claim 17, wherein the content type is a transcript of a conversation, and each of the plurality of portions comprises a separate utterance within the transcript.

19. The system of claim 10, further comprising a display, wherein the processing further comprises causing the display to display the new text.

20. A method of automatically generating a text evaluation using unsupervised text segmentation by topic comprising:

receiving, at a processor, original text comprising a transcript of a conversation;

dividing, by the processor, the original text into a plurality of portions, wherein each of the plurality of portions comprises a separate utterance within the transcript;

generating, by the processor, a plurality of vectors from the original text, the generating comprising processing the original text with at least one unsupervised learning algorithm, each of the plurality of vectors corresponding to a separate portion of the plurality of portions of the original text;

for each of the plurality of vectors, determining, by the processor, a segment to which the vector belongs of a plurality of segments, the determining comprising performing inner product processing on the vector and at least one additional vector of the plurality of vectors, the plurality of segments comprising separate elements of the conversation;

for each of the plurality of segments, minimizing, by the processor, a distance between at least one vector belonging to the segment and a known vector from among one or more known vectors that correspond to one or more of the portions of the original text, the known vector having a label;

generating, by the processor, a new text comprising the one or more of the portions of the original text, the one or more of the portions of the original text being included in the new text based on the label; and sending, by the processor, the new text to an evaluation system configured to evaluate the elements of the conversation corresponding to the at least one of the portions included in the new text.

* * * * *